United States Patent [19]

Schafheutle et al.

[11] Patent Number: 5,646,236
[45] Date of Patent: Jul. 8, 1997

[54] POLYESTERS AND THEIR USE AS ADDITIVES IN COATING COMPOSITIONS

[75] Inventors: Markus A. Schafheutle, Hochheim; Achim Voelker, Wiesbaden; Susanne Wehner, Villmar; Gerd Walz, Wiesbaden; Joachim Zoeller, Mainz, all of Germany

[73] Assignee: Hoechst Aktiengesellschaft, Frankfurt, Germany

[21] Appl. No.: 380,662

[22] Filed: Jan. 30, 1995

[30] Foreign Application Priority Data

Jul. 1, 1994 [DE] Germany ............... 44 23 141.5

[51] Int. Cl.⁶ ..................... C08G 63/44; C08G 69/44
[52] U.S. Cl. ............... 528/288; 528/272; 528/296; 528/300; 528/301; 528/302; 528/307; 528/308; 528/308.6; 528/332; 528/335; 528/339; 528/340; 528/346; 528/350; 528/354; 528/361
[58] Field of Search ............... 528/272, 288, 528/296, 300, 301, 302, 307, 308, 308.6, 332, 335, 339, 340, 346, 350, 354, 361

[56] References Cited

U.S. PATENT DOCUMENTS

| | | | |
|---|---|---|---|
| 4,346,214 | 8/1982 | Blount | 528/275 |
| 5,468,441 | 11/1995 | Homann et al. | 264/331.21 |
| 5,484,842 | 1/1996 | Lewarchik et al. | 524/608 |

*Primary Examiner*—Samuel A. Acquah
*Attorney, Agent, or Firm*—Foley & Lardner

[57] ABSTRACT

Polyesters obtained by reacting from 5 to 50 parts of at least one linear or branched, aliphatic or cycloaliphatic, at least dihydric alcohol, from 2 to 40 parts of at least one at least dibasic, aromatic carboxylic acid, from 0 to 40 parts of at least one 2-alkenyldicarboxylic anhydride, from 10 to 30 parts of at least one at least dibasic, linear or branched, aliphatic carboxylic acid, from 0 to 15 parts of an aliphatic, linear or branched hydroxy acid, from 0 to 15 parts of an aliphatic, linear or branched polyamine having at least one primary and at least one secondary or tertiary amino group, from 0 to 15 parts of a glycidyl ester of a branched, aliphatic monocarboxylic acid or of a glycidyl ether of a branched, aliphatic alcohol, and from 0 to 15 parts of polyhydroxyamine are useful, for example, as additives in coating compositions.

30 Claims, No Drawings

POLYESTERS AND THEIR USE AS ADDITIVES IN COATING COMPOSITIONS

BACKGROUND OF THE INVENTION

1. Field of the Invention

The invention relates to water-dispersible and to organic solvent soluble polyesters and to their preparation and use, for example, as additives in coating compositions.

2. Description of Related Art

The process of electrodeposition coating has been found to be advantageous for the coating of metal panels. In the cataphoretic coating of zinc-coated metal panels with the binders conventionally employed, surface defects become evident in the baked film, especially at the relatively high deposition voltages which are required in order to achieve high coat thicknesses.

Patent application EP-A-0 569 842 describes urethanes which have the ability, when added to cationic electrodeposition coating baths (EDC baths), to prevent these phenomena. These urethanes are low molecular weight compounds and are therefore, subject to different approval regulations in different geographical states. The toxicological properties of such compounds are not entirely harmless. Furthermore, these urethanes are not of equal compatibility with all of the binders conventionally used. In the case of relatively thick coatings in particular, uneven distribution in the film may occur, which manifests itself likewise in the form of surface defects.

SUMMARY OF THE INVENTION

An object of the invention is therefore to provide additives which are toxicologically harmless and which are of greater compatibility with the conventional binders, and which, as an additive to electrodeposition coating baths, suppress the formation of surface defects when coating zinc-coated metal panels, and make it possible to apply relatively thick coats.

It is also a subject of the present invention to provide processes of making and using such additives, dispersions and solutions containing such additives, and metal substrates coated with such additives.

In accordance with these objects, it has surprisingly been found that specific polyesters according to the invention, in the form of dispersions and solutions, are able to suppress these surface defects when added to EDC baths, and make it possible to apply relatively thick and defect-free coatings. The polyesters according to the invention are toxicologically harmless and are of optimum compatibility with the binders conventionally used in cataphoretic deposition coating. Also, the polyesters reduce the deposition voltage in the electrophoretic coating of metals, such as zinc-coated metal plates.

In accordance with the objects, there is provided polyesters obtainable by reacting:

(A) from 5 to 50 parts of at least one linear or branched, aliphatic or cycloaliphatic, at least dihydric alcohol, (B) from 2 to 40 parts of at least one at least dibasic, aromatic carboxylic acid, (C) from 0 to 40 parts of at least one 2-alkenyldicarboxylic anhydride, (D) from 10 to 30 parts of at least one at least dibasic, linear or branched, aliphatic carboxylic acid, (E) from 0 to 15 parts, preferably from 2 to 10 parts, of an aliphatic, linear or branched hydroxy acid, (F) from 0 to 15 parts, preferably from 2 to 10 parts, of an aliphatic, linear or branched polyamine having at least one primary and at least one secondary or tertiary amino group, (G) from 0 to 15 parts, preferably from 2 to 10 parts, of a glycidyl ester of a branched, aliphatic monocarboxylic acid or of a glycidyl ether of a branched, aliphatic alcohol, and (H) from 0 to 15 parts, preferably from 2 to 10 parts, of one or more polyhydroxyamines.

In accordance with other aspects of the invention, there is provided aqueous dispersions and solutions of these polyesters and processes of preparing these dispersions and solutions. In particular, there has been provided a process for the preparation of an aqueous polyester dispersion, which comprises:

(a) esterifying components (A), (B), (C, if present) and (H, if present) in bulk or in solution in an inert solvent, in the presence of a catalyst;

(b) reacting components (D) and (E, if present) together with the reaction product from (a);

(c) optionally reacting the carboxyl groups of the reaction product from (b), with component (F), to form amide groups; and (d) optionally reacting remaining carboxyl groups with the glycidyl groups of component (G);

(e) after neutralization, dispersing the resulting hydroxy- and amino-containing polyester in water.

There also is provided a process for the preparation of a polyester solution which comprises:

(a) esterifying components (A), (B), (C, if present) and (H, if present) in bulk or in solution in an inert solvent, in the presence of a catalyst;

(b) reacting components (D) and (E, if present) together with the reaction product from (a);

(c) optionally reacting the carboxyl groups of the reaction product from (b), with component (F), to form amide groups;

(d) optionally reacting the remaining carboxyl groups with the glycidyl groups of component (G), (e) dissolving the resulting hydroxy- and amino-containing polyester in a water-miscible solvent.

In accordance with the invention, there is also provided an electrophoretic deposition coating bath comprising a polyester as described above.

In accordance with the invention, there is also provided a process for coating zinc-coated metal panels by means of an electrophoretic coating procedure, the improvement wherein the electrophoresis bath comprises a polyester as described above.

In accordance with the invention, there is also provided a zinc-coated metal panel coated with a composition comprising a polyester.

Further objects, features, and advantages of the invention will become apparent from the detailed description which follows.

DETAILED DESCRIPTION

The terms "parts" and "%", used above and in the text below, always refer to proportions by mass (parts by weight). The proportions of the individual components (A) to (H) should be chosen such that the sum of the proportions by mass is always 100 parts or 100%.

The polyhydric alcohols (A) may be any meeting the above description and are generally selected from the linear, aliphatic diols (A1), the branched, aliphatic diols (A2), the cycloaliphatic diols (A3), the trihydric or polyhydric, linear, aliphatic alcohols (A4) and the trihydric or polyhydric, branched, aliphatic and cycloaliphatic alcohols (A5), generally having in each case up to 20, preferably up to 15, carbon atoms. The proportion by mass of the compounds (A), which may be employed individually or as a mixture of two or more compounds, may be used to give desired results and, is generally from 5 to 50%, preferably from 10 to 45%, and particularly preferably from 15 to 40%.

Suitable compounds (A1) include all linear aliphatic diols, including aliphatic diols having from 2 to 16 carbon atoms, for example, the 1,2-diols such as ethylene glycol, propylene glycol and butylene glycol, and the αω-diols such as 1,3-propanediol, 1,4-butanediol, 1,6-hexanediol, and 1,12-dodecanediol.

Suitable branched, aliphatic diols (A2) include all such compounds, including compounds having from 4 to 16 carbon atoms, for example, isobutylene glycol, neopentylglycol, pinacol, 3-methyl-,1,2-butanediol, and 3,4-diethyl-3,4-hexanediol.

Suitable cycloaliphatic diols (A3) include all such compounds, including compounds having from 6 to 15 carbon atoms, for example, cyclohexanediol, cyclohexanedimethanol, or perhydrogenated bisphenol A.

Suitable polyhydric, linear, aliphatic alcohols (A4) include all such compounds, for example, compounds having from 3 to 10 carbon atoms, for example, glycerol, erythritol, arabitol, adonitol, xylitol, mannitol, sorbitol, perseitol, and volemitol.

Suitable polyhydric, branched, aliphatic alcohols (A5) include all such compounds, for example, compounds having from 5 to 15 carbon atoms, for example, trimethylolethane, trimethylolpropane, pentaerythritol, dipentaerythritol, and ditrimethylolpropane.

The polybasic, aromatic carboxylic acids (B) are selected from any of such compounds, for example, those having 8 to 20 carbon atoms, such as the isomeric phthalic acids orthophthalic, isophthalic and terephthalic acid, the isomeric naphthalenedicarboxylic acids, 4,4'-sulfonyldibenzoic acid and diphenyl ether 4,4'-dicarboxylic acid. Tricarboxylic acids such as trimellitic acid, hemimellitic acid and trimesic acid can also be used, preferably in a mixture with a dicarboxylic acid whose proportion is greater than that of the tricarboxylic acid. The compounds (B) are employed individually or in a mixture, generally, in a quantity of from 2 to 40%, preferably from 4 to 30%. Particular preference is given to mixtures of isophthalic and terephthalic acid.

If desired, up to 40% of cyclic alkenyldicarboxylic anhydrides (C) are employed as additional acid component. Any such anhydrides can be used. Preference is given to alkenylsuccinic anhydrides, for example, C 5–24 alkenylsuccinic anhydrides, such as dodecenylsuccinic anhydride, in a quantity of from 10 to 40%, particularly preferably from 15 to 30%.

The polybasic, aliphatic carboxylic acids (D) are selected from any of the aliphatic and cycloaliphatic, linear and branched di- and polycarboxylic acids, preferably having 2 to 36 carbon atoms. Suitable linear, aliphatic dicarboxylic acids include malonic acid, succinic acid, glutaric acid, adipic acid and higher homologues, with malonic and adipic acid being preferred. Among the cycloaliphatic dicarboxylic acids preference is given to cyclohexanedicarboxylic acid. The compounds (D) are generally employed in a proportion of from 10 to 30%, preferably from 15 to 25%.

The aliphatic hydroxy acids (E) may be any such acids, and generally have from two to ten carbon atoms. Each contain at least one hydroxyl and one carboxyl group, preferably at least one carboxyl group and two hydroxyl groups. Examples of suitable compounds include glycolic acid, lactic acid, dihydroxysuccinic acid, tartaric acid, malic acid, and dimethylolpropionic acid. They are generally employed in quantities of from 0 to 15%, preferably from 5 to 10%.

The aliphatic polyamines (F) generally have from 4 to 15 carbon atoms, and in each case at least one primary and at least one secondary or tertiary amino group. Preference is given to amines having a tertiary amino group, and particular preference to those having a dimethylamino group. Suitable examples include N,N-dimethylethylenediamine, N,N-dimethylpropylenediamine and N,N-dimethylbutylenediamine, N-aminoethylpiperidine, N-aminoethylmorpholine, N-aminoethylpiperazine and N-aminopropylmorpholine. The polyamines are generally employed in quantities of from 0 to 15%, preferably from 2 to 10%.

The glycidyl compounds (G) include any such compounds and are preferably aliphatic in nature and are generally selected from the glycidyl esters of branched, aliphatic monocarboxylic acids having from 5 to 12 carbon atoms, such as the grades Cardura® E5 and E10 obtainable from Shell Chemicals, and the glycidyl ethers of branched, aliphatic alcohols generally having from 4 to 20 carbon atoms, such as 2-ethylhexanol, tert-butanol, isoamyl alcohol and isodecyl alcohol. The glycidyl compounds are generally employed in quantities of from 0 to 15%, preferably from 5 to 10%.

The polyhydroxyamines (H) include all polyhydroxyamines and are generally organic, primary, secondary or tertiary mono- or polyamines which contain at least one, and preferably two or more, hydroxyl groups, and generally having 4 to 30 carbon atoms. Particularly preferred tertiary amines are those having two hydroxyl groups. Suitable polyhydroxyamines include, in particular, aliphatic polyhydroxyamines, such as N-alkyl-N,N-bishydroxyalkylamines, for example, N-methyldiethanolamine or N-propyldiethanolamine, trishydroxyalkylamines such as triethanolamine, N,N-bis(2-hydroxyethyl)isopropanolamine and tripropanolamine, N,N,N'N'-tetrakis-hydroxyalkyl-alkylenediamines such as N,N, N',N'-tetrakis-hydroxyethyl-ethylenediamine (THEED) or N,N,N',N'-tetrakis-2-hydroxypropyl-ethylenediamine, pentakis-hydroxyalkyl-dialkylenetriamines such as diethylenetriaminepentaethanol, cyclic hydroxyamines such as 2,6-bis(hydroxymethyl)pyridine, N,N'-bis(2-hydroxyethyl)piperazine,N,N-bis(2-hydroxyethyl)-p-phenylenediamine, 2,5-bis(hydroxymethyl)pyrrolidine and N-methyl-2,5-bis(hydroxymethyl)pyrrolidine. Particular preference is given to N-methyldiethanolamine and triethanolamine. The polyhydroxyamines (H) are generally employed in a quantity of from 0 to 15%, preferably from 1 to 10%.

The polyester described above may be used in any desired form in any desired application. Especially useful are aqueous dispersion and organic solvent solutions of the polyesters. The polyester dispersions according to the invention are prepared in any desired manner.

Any combination of reaction steps which is chemically feasible will lead to the polyester of the present invention when the educts as described above are used.

A preferred method is now described. In the methods, the stated times, temperatures, and acid numbers are preferred, but not required. In the first step, the compounds (A), (B)

and if desired (C) and (H) are esterified in solution or preferably in bulk, in the presence of a transesterification catalyst. Water of reaction is removed in circulation or, by distillation, via a column. In this step the temperature is preferably slowly increased until an acid number of less than 15 mg of KOH/g, preferably below 10 mg of KOH/g, is reached. After cooling, for example, to 120° to 180° C., the polycarboxylic acid (D) and the hydroxy acid (E) are added, preferably the temperature is slowly raised to 180° to 210° C., and the condensation is continued down to an acid number of below 35, preferably below 15, mg of KOH/g. For this purpose it is possible to apply a slight vacuum of from 30 to 100 mbar.

After cooling to 120° to 180° C. and gassing with nitrogen, component (F) and if desired, component (H) are added, if they contain primary or secondary amino groups, and the batch is reacted with stirring until an amine number of from 25 to 35 mg of KOH/g is reached. If desired, component (G), optionally in addition to a further transesterification catalyst, is added after cooling to about 100° C. At a temperature of below 100° C. the batch is neutralized, for example, with formic acid and is adjusted to a solids content, for example, of from about 30 to 35% by addition of water.

In another process embodiment, components (A) to (E) and (H) are subjected together to an esterification reaction, after which the product is reacted in two further steps, first with the polyamine (F) and, if desired, the hydroxyamine (H), and then with the glycidyl component (G).

The polyester solutions according to the invention are prepared in analogy to the dispersions. However, the neutralization step and the subsequent addition of water are omitted. Instead of this, the batch is cooled and dissolved in a solvent which is miscible with water and inert toward the polyester. Any such solvents may be used. Preference is given to half-ethers of aliphatic diols, such as methoxyethanol or methoxypropanol. Oligoethylene glycol monomethyl or monoethyl ethers are equally suitable. Methoxypropanol is particularly preferred.

The polyester dispersions and polyester solutions according to the invention can be used as an additive in EDC baths. They are used in an effective amount, which is conventionally a quantity of from 0.1 to 5%, calculated as solid resin and based on the mass of the bath liquid. The addition of the polyesters according to the invention to a conventional cataphoresis bath, containing cathodically depositable binders, brings about an increase in the coat thickness, at a given deposition voltage and deposition time, in relation to an otherwise identical bath without this addition. In the case of the coating of hot-galvanized or galvanized metal panels, the surface defects which otherwise occur are suppressed. Owing to the improved coat formation properties of the cataphoresis baths modified with the polyester according to the invention, it is also possible to apply lower voltages in order to achieve the intended coat thickness. This reduces the energy consumption and, at the same time, the tendency for surface defects to develop.

The electrodeposition coating baths according to the invention additionally contain the binders (cathodically depositable synthetic resin), crosslinking agents, pigments, catalysts and additives which are conventional for this purpose. Any of such materials may be used with the polyester of the present invention. Examples of suitable binders include cationic amine-modified epoxy resins which are autocrosslinking or, preferably, which crosslink by means of external agents.

The term cationic amine-modified epoxy resins refers to cationic reaction products of modified or unmodified polyepoxides, primary and/or secondary amines and/or their salts, and/or salts of tertiary amines and, if desired, polyols, polycarboxylic acids, polyamines or polysulfides.

The binders which are preferably suitable are aminourethane resins as described in EP-A 0 274 721, EP-A 0 272 665, and EP-A 0 234 395, each of which are incorporated by reference in their entirety.

Where these binders are not autocrosslinking, the crosslinking agents employed may be phenolic resins, polyfunctional Mannich bases, melamine resins, benzoguanamine resins, or blocked polyisocyanates.

The preparation of pigment pastes is known in general (cf. D. H. Parker, *Principles of Surface Coating Technology*, Interscience Publishers, New York (1965); R. L. Yates, *Electropainting*, Robert Draper Ltd., Teddington/England (1966); H. F. Payne, *Organic Coating Technology, Volume 2*, Wiley and Sons, New York (1961)). The pigment pastes may in principle contain all pigments which are suitable for electrodeposition coatings. In general titanium dioxide is the only, or the principal, white pigment. Other white pigments or extenders, such as antimony oxide, zinc oxide, basic lead carbonate, basic lead sulfate, barium carbonate, porcelain, clay, calcium carbonate, aluminum silicate, silicon dioxide, magnesium carbonate and magnesium silicate can also be used, however. Examples of color pigments which may be used include cadmium yellow, cadmium red, carbon black, phthalocyanine blue, chromium yellow, toluidyl red and hydrated iron oxide.

In addition to the pigments the pigment paste may also contain plasticizers, fillers, wetting agents, and the like.

The pigment paste is added to the aqueous dispersion of the cathodically depositable synthetic resin in a quantity such that the finished electrodeposition coating bath has the properties which are required for the deposition. In most cases the mass ratio of pigment to cathodically depositable synthetic resin is 0.05 to 0.5.

The polyesters according to the invention are added at the coating formulation stage.

In addition to the cathodically depositable synthetic resin, the pigment paste and the polyester according to the invention, the electrodeposition coating baths according to the invention may also contain other conventional additives, for example, additional solvents, antioxidants, surface-active agents, etc.

The solids content of the electrodeposition coating baths according to the invention is preferably from 7 to 35%, and particularly preferably from 12 to 25%. The pH of the electrodeposition coating baths is generally between 4 and 8, preferably between 5 and 7.5.

The electrodeposition coating baths according to the invention can be used for coating any desired electrically conducting substrates, but in particular for coating metals, such as steel, aluminum, copper and the like. The steel may be zinc-coated, phosphatized, or nonphosphatized.

The invention also relates to a process for coating electrically conductive substrates, in which the substrate is immersed in an aqueous electrodeposition coating bath containing at least one cathodically-depositable synthetic resin. The substrate is connected as cathode, a film is deposited on the substrate by direct current, the substrate is removed from the electrodeposition coating both and the deposited coating film is baked.

The process is distinguished by the aqueous electrodeposition coating bath containing a polyester as defined above.

The electrodeposition coating bath is contacted with an electrically conducting anode and with the electrically conductive substrate which is connected as cathode. When electric current is passed between anode and cathode, a firmly adhering coating film is deposited on the substrate.

The temperature of the electrodeposition coating bath should generally be between 15° and 40° C., preferably between 25° and 35° C.

The voltage applied can vary within a wide range, and may, for example, be between 2 and 1000 volts. However, typical operating voltages are between 50 and 500 volts. The current density is generally between about 10 and 3000 amperes/m$^2$. The current density drops in the course of the deposition.

Following deposition, the coated article is rinsed and is ready for baking.

The deposited coating films are generally baked at temperatures of from 130° to 200° C. for a usual period of from 10 to 60 minutes, preferably at from 150° to 180° C. for a period of from 15 to 30 minutes.

The invention is illustrated by the following non-limiting examples. All percentages and parts by weight are by mass, and percentages should be read as adding to give 100%.

EXAMPLES

Example 1

7.48% of neopentylglycol, 2.88% of trimethylolpropane, 4.31% of terephthalic acid, 3.74% of isophthalic acid and 0.02% of dibutyltin oxide are placed in a vessel and heated to 185° C. During this operation, the water of reaction formed is distilled off via a packed column. The temperature of the composition is increased slowly to 205° C. until the acid number of the resin is less than 10 mg of KOH/g. After cooling the composition to 150° C., 6.47% of adipic acid and 2.16% of dimethylolpropionic acid are added. Condensation is then continued for 1 hour at a slowly increasing temperature up to a maximum of 195° C. After cooling to 155° C., a vacuum of 50 mbar is applied until the acid number is less than 33 mg of KOH/g. After gassing with nitrogen, 1.44% of dimethylaminopropylamine are added and the mixture is stirred at 150° C. until the amine number has reached 27.8 mg of KOH/g. Following addition of 3.19% of Versatic acid glycidyl ester and 0.02% of cobalt octanoate, the composition is cooled to 100° C. over the course of 1 hour. During this, the acid number falls to <1 mg of KOH/g. When the temperature reaches 95° C., 0.44% of 85% strength formic acid is added and is stirred in for 10 min. The batch is then dispersed with 68% of deionized water and adjusted to the final solids content of 32%. A white, finely divided dispersion is obtained in which the polymer has a weight-average molecular mass of 4880 g/mol.

Example 2

9.82% of neopentylglycol, 3.1% of trimethylolpropane, 1.72% of terephthalic acid, 4.01% of isophthalic acid, 4.59% of dodecenylsuccinic anhydride and 0.02% of dibutyltin oxide are placed in a vessel and slowly heated to 205° C. The water of reaction which is formed during this operation is distilled off via a packed column. When the acid number is less than 10 mg of KOH/g, the batch is cooled to 150° C. and 6.93% of adipic acid are added. Condensation is then carried out, with the temperature increasing again up to 205° C., until the acid number is again less than 10 mg of KOH/g. The batch is then stirred under a vacuum of 50 mbar until the acid number is less than 1 mg of KOH/g. After gassing with nitrogen and cooling to 150° C., 1.81% of dimethylaminopropylamine are added and the mixture is stirred until the amine number has reached 33 mg of KOH/g. It is then cooled to 95° C. and neutralized with 0.52% of 85% strength formic acid, which is stirred in for 10 min. Dispersion is carried out with 67.48% of deionized water, and the dispersion is adjusted to the solids content of 32%.

Example 3

23.63% of neopentylglycol, 7.47% of trimethylolpropane, 4.13% of terephthalic acid, 9.66% of isophthalic acid, 11.04% of dodecenylsuccinic anhydride and 0.03% of dibutyltin oxide are placed in a vessel and slowly heated to 205° C. The water of reaction which forms during this operation is distilled off via a packed column. As soon as the acid number has fallen below 10 mg of KOH/g, the mixture is cooled to 150° C. and 16.69% of adipic acid are added. Condensation is continued, with the temperature increasing again up to 205° C., until the acid number has fallen below 10 mg of KOH/g. A vacuum of 50 mbar is then applied and stirring is continued until the acid number has fallen below 1 mg of KOH/g. After gassing with nitrogen and cooling to 150° C., 4.35% of dimethylaminopropylamine are added and stirring is continued until the amine number has reached 33 mg of KOH/g. After cooling the composition to room temperature it is dissolved in methoxypropanol to give a 77% solution.

Example 4

Preparation of an Aqueous Binder Dispersion 4.1 In analogy to European Patent EP-B 0 000 086, which is incorporated by reference in its entirety, Example 31, an epoxy/amine adduct was prepared as follows:

210 parts of diethanolamine, 102 parts of N,N-dimethylaminopropylamine and 636 parts of an adduct of 1 mol of 2-methylpentamethylenediamine and 2 mol of the glycidyl ester of Versatic acid (Cardura® E10 from Shell) are added to 3400 parts of bisphenol A epoxy resin (molar mass per epoxide group—"Epoxide equivalent weight"— about 480 g/mol) in 2341 parts of 2-methoxypropanol (about 65%). The reaction mixture was stirred at from 60° to 90° C. for 4 hours and then held at 120° C. for one hour.

Hydroxyl No.: about 155 mg of KOH/g of solid resin.

Amine No.: about 77 mg of KOH/g of solid resin.

4.2 Preparation of the (partially) blocked polyisocyanates 4.2.1 124 parts (1.05 mol) of butylglycol and 0.3 part of dibutyltin laurate (DBTL) are run into 174 parts of Desmodur® T80 (80% 2,4-, 20% 2,6-tolylene diisocyanate; about 1 mol) at from 40° to 60° C. over the course of from 60 to 120 min, and the mixture is then held at this temperature until it has an NCO content of from about 12.8 to 13.5%.

4.2.2 42.4 parts of trimethylolpropane are introduced in portions to 298 parts of the compound 4.2.1 in 146 parts of toluene, and the mixture is reacted at 80° C. until a % NCO value of virtually 0 is reached (about 70%, 51% TDI).

4.3 Preparation of the binder dispersion

[A] parts (see Table 1 below) of binder solution (4.1.) are mixed with [B] parts of curing agent solution (4.2.2.), 5 parts of Texanol®, 1.5 parts of 2-ethylhexanol and 2.3 parts of 50% strength aqueous formic acid (MEQ25) and the mixture is concentrated in vacuo (up to 20 mbar) at temperatures of up to 80° C., to a solids content of about 90%. Subsequently, 139 parts of deionized water and thorough stirring are employed to produce the two following 40% strength dispersions:

TABLE 1

| Binder dispersion | [A] Parts | [B] Parts | number-average particle size nm | weight-average particle size nm | TDI content in the binder % |
|---|---|---|---|---|---|
| 4.4 | 123.7 | 28.0 | 240 | 560 | 10.0 |
| 4.5 | 120.6 | 32.7 | 216 | 500 | 12 |

Example 5

Preparation of a Pigment Paste

A catalyst paste containing dibutyltin oxide is prepared according to the following formulation:

30 g of ethoxypropanol, 3 g of wetting agent, 2 g of acetic acid (100%) and 40 g of dibutyltin oxide are mixed in a dissolver and dispersed at from 50° to 60° C. for 2 hours. Then 60 g of a dispersion resin according to EP-A 0 183 025 herein incorporated by reference in its entirety, Example 3 (55%), are added, followed by 64 g of fully deionized water. After homogenization the mixture is ground on an appropriate mill in two milling operations, to the required degree of particle fineness.

10.6 parts of the binder of Example 4.4, 0.6 part of acetic acid (50% strength), 0.6 part of 2,4,7,9-tetramethyl-5-decyne-4,7-diol [Surfynol® 104, wetting agent] and 12.3 parts of the catalyst paste are mixed with one another. 4.0 parts of lead silicate, 0.4 part of carbon black and 40.2 parts of titanium oxide are added thereto with stirring. The mixture is adjusted to an appropriate viscosity with 31.3 parts of fully deionized water, and the pigment paste is ground on an appropriate mill to an adequate particle size.

Example 6

Coating Formulation 300 parts of the binder dispersion (40%) of Example 4.4 are diluted by stirring with 180 parts of fully deionized water to a solids content of about 25%. This clearcoat solution is admixed with 109 parts of the pigment paste of Example 5 and 1.2 parts of 50% strength formic acid. It is then adjusted to a solids content of about 18% with fully deionized water. The pigment/binder ratio is approximately 0.4:1.

Deposition/Deposition Results:

The coating formulations are subjected to cataphoretic deposition in an open glass vessel. Zinc-coated substrates act as cathode, while the anode—at a distance from the cathode of from 5 to 10 cm—is bright sheet steel. The bath temperature is 28° C. and the deposition period is 2 minutes. Stirring is effected by means of a PTFE-coated magnetic stirrer rod.

In each case 0, 0.5 or 1.0% of solid resin, based on the mass of the bath, of the additive of Example 1 according to the invention is added to the coating formulation.

The voltages applied, the film thicknesses obtained and the surface quality of the deposited and subsequently cured films (baking period 20 min, oven temperature 165° C.) in each case are given in Table 2 below.

TABLE 2

Using hot-galvanized steel panels (Rb 24/NL 60)

| | Coat thickness in μm | | |
|---|---|---|---|
| Voltage in volts | Coating formulation without addition | Addition of 0.5% polyester | Addition of 1.0% polyester |
| 225 | 10 | 11 | 15.5 |
| 250 | 12.5 | 15 | 19 |
| 275 | 15 (O) | 18 | 22 |

O = Surface defects

TABLE 3

Using electrolytically zinc-coated steel panels (Rb 26/NL 60)

| | Coat thickness in μm | | |
|---|---|---|---|
| Voltage in volts | Coating formulation without addition | Addition of 0.5% polyester | Addition of 1.0% polyester |
| 225 | 12 | 12.5 | 15 |
| 250 | 15 | 18 | 20 |
| 275 | 20 (O) | 22 | 25 |

O = Surface defects

At a constant deposition voltage, the addition of the polyester dispersion according to the invention brings about, relative to the unmodified coating composition, a distinct increase in the coating thickness, or conversely allows the desired coat thickness to be achieved at a lower deposition voltage. Whereas with the unmodified coating compositions surface defects occur even at 275 V. Considerably thicker coats can be achieved without surface defects using the coating composition modified in accordance with the invention.

It is intended that the examples be considered as exemplary only. Other embodiments of the invention will be apparent to those skilled in the art from consideration of the specification and practice of the invention disclosed herein.

What is claimed is:

1. A polyester obtained by reacting compounds consisting of (A) from 5 to 50 parts of at least one linear or branched, aliphatic or cycloaliphatic, at least dihydric alcohol selected from the group consisting of: linear, aliphatic diols (A1) selected from the group consisting of ethylene glycol, 1,2-propylene glycol, 1,2-butylene glycol, 1,3-propane diol, 1,4-butane diol, 1,6-hexane diol and 1,12-dodecane diol; branched, aliphatic diols (A2) selected from the group consisting of isobutylene glycol, neopentyl glycol, pinacol, 3-methyl 1,2-butane diol and 3,4-diethyl hexane diol; cycloaliphatic diols (A3) selected from the group consisting of cyclohexane diol, perhydrogenated bisphenol A and cyclohexane dimethanol; polyhydric linear alcohols (A4) selected from the group consisting of glycerol, erythritol, arabitol, adonitol, xylitol, mannitol, sorbitol, perseitol and volemitol; and polyhydric alcohols (A5) selected from the group consisting of trimethylol ethane, trimethylol propane, pentaerythitol, dipentaerythritol and ditrimethylol propane, (B) from 2 to 40 parts of at least one at least dibasic, aromatic carboxylic acid, (C) from 0 to 40 parts of at least one 2-alkenyldicarboxylic anhydride, (D) from 10 to 30 parts of at least one at least dibasic, linear or branched, aliphatic carboxylic acid, (E) from 0 to 15 parts of an aliphatic, linear or branched hydroxy acid, (F) from 2 to 15 parts of an aliphatic, linear or branched polyamine having at least one primary and at least one secondary or tertiary amino group, (G) from 0 to 15 parts of a glycidyl ester of a branched, aliphatic monocarboxylic acid or of a glycidyl ether of a branched, aliphatic alcohol, and (H) from 0 to 15 parts of polyhydroxyamine, wherein parts are parts by weight and the total parts add up to 100.

2. A polyester as claimed in claim 1, comprising from 10 to 45 parts by weight of A.

3. A polyester as claimed in claim 1, wherein (A) comprises one or more of the linear, aliphatic diols (A1).

4. A polyester as claimed in claim 1, wherein (A) comprises one or more of the branched, aliphatic diols (A2).

5. A polyester as claimed in claim 1, wherein (A) comprises one or more of the cycloaliphatic diols (A3).

6. A polyester as claimed in claim 1, wherein (A) comprises one or more of the polyhydric linear alcohols (A4).

7. A polyester as claimed in claim 1, wherein (A) comprises one or more of the polyhydric alcohols (A5).

8. A polyester as claimed in claim 1, wherein the polybasic, aromatic carboxylic acid (B) is selected from the group consisting of the isomeric phthalic acids orthophthalic, isophthalic and terephthalic acid, isomeric naphthalenedicarboxylic acids, 4,4'-sulfonyldibenzoic acid, diphenyl ether 4,4'-dicarboxylic acid, trimellitic acid, hemimellitic acid, and trimesic acid.

9. A polyester as claimed in claim 1, wherein in its synthesis, tricarboxylic acids are used as a minor portion in a mixture with dicarboxylic acids.

10. A polyester as claimed in claim 1, wherein component (B) comprises a mixture of isophthalic and terephthalic acid.

11. A polyester as claimed in claim 1, wherein component (C) is employed and wherein (C) comprises 2-dodecenylsuccinic anhydride.

12. A polyester as claimed in claim 1, wherein the polybasic, aliphatic carboxylic acid (D) comprises an aliphatic or cycloaliphatic, linear or branched, di- or polycarboxylic acid.

13. A polyester as claimed in claim 1, wherein component (D) is selected from the group consisting of malonic acid, succinic acid, glutaric acid, adipic acid, suberic acid, and sebacic acid.

14. A polyester as claimed in claim 1, wherein component (D) comprises cyclohexanedicarboxylic acid.

15. A polyester as claimed in claim 1, wherein component (E) is employed and wherein component (E) comprises an acid having from two to ten carbon atoms and at least one hydroxyl and one carboxyl group.

16. A polyester as claimed in claim 1, wherein component (E) is selected from one or more of the group consisting of glycolic acid, lactic acid, dihydroxysuccinic acid, tartaric acid, malic acid, and dimethylolpropionic acid.

17. A polyester as claimed in claim 1, wherein component (F) comprises an aliphatic polyamine having from 4 to 15 carbon atoms and at least one primary and at least one secondary or tertiary amino group.

18. A polyester as claimed in claim 1, wherein component (F) is selected from one or more of the group consisting of N,N-dimethylethylene diamine, N,N-dimethylpropylenediamine, N,N-dibutylenediamine, N-aminoethylpiperidine, N-aminoethylmorpholine, N-aminoethylpiperazine, and N-aminopropylmorpholine.

19. A polyester as claimed in claim 1, wherein component (G) is employed and comprises one or more glycidyl ester of branched, aliphatic monocarboxylic acids having from 5 to 12 carbon atoms or glycidyl ethers of branched, aliphatic alcohols.

20. A polyester as claimed in claim 1, wherein component (H) is employed and comprises one or more primary, secondary or tertiary mono- or polyamines containing at least one hydroxyl group.

21. A polyester as claimed in claim 1, wherein the component (H) is employed and comprises one or more tertiary polyhydroxyalkylamines.

22. A polyester obtained by reacting compounds consisting of (A) from 5 to 50 parts of at least one linear or branched, aliphatic or cycloaliphatic, at least dihydric alcohol, (B) from 2 to 40 parts of at least one at least dibasic, aromatic carboxylic acid, (C) from 0 to 40 parts of at least one 2-alkenyldicarboxylic anhydride, (D) from 10 to 30 parts of at least one at least dibasic, linear or branched, aliphatic carboxylic acid, (E) from 0 to 15 parts of an aliphatic, linear or branched hydroxy acid, (F) from 2 to 15 parts of an aliphatic, linear or branched polyamine having at least one primary and at least one secondary or tertiary amino group, (G) from 0 to 15 parts of a glycidyl ester of a branched, aliphatic monocarboxylic acid or of a glycidyl ether of a branched, aliphatic alcohol, and (H) from 0 to 15 parts of polyhydroxyamine, wherein parts are parts by weight and the total parts add up to 100.

23. A polyester as claimed in claim 22, wherein (C) is employed.

24. A polyester as claimed in claim 22, wherein (E) is employed.

25. A polyester as claimed in claim 22, wherein (G) is employed.

26. A polyester as claimed in claim 22, wherein (H) is employed.

27. A polyester as claimed in claim 22, wherein component (F) comprises an aliphatic polyamine having from 4 to 15 carbon atoms and at least one primary and at least one secondary or tertiary amino group.

28. A polyester as claimed in claim 22, wherein component (F) is selected from one or more of the group consisting of N,N-dimethylethylene diamine, N,N-dimethylpropylenediamine, N,N-dibutylenediamine, N-aminoethylpiperidine, N-aminoethylmorpholine, N-aminoethylpiperazine, and N-aminopropylmorpholine.

29. A polyester as claimed in claim 1, made by a process comprising:

(a) esterifying components (A), (B), and if present, (C) and (H) in bulk or in solution in an inert solvent, in the presence of a catalyst;

(b) reacting components (D) and if present, (E) with the reaction product from (a);

(c) reacting the carboxyl groups of the reaction product from (b), with component (F) and if present, (H) to form amide groups;

(d) optionally reacting remaining carboxyl groups with the glycidyl groups of component (G), if present; and (e) optionally neutralizing the reaction product from (d).

30. A polyester as claimed in claim 1, made by:

(a) esterifying components (A), (B), (D) and, if present, (C), (E), and (H) in bulk or in solution in an inert solvent, in the presence of a catalyst;

(b) reacting component (F) with the reaction product from (a);

(c) optionally reacting (H), if present, with the reaction product from (b);

(d) optionally reacting (G), if present, with the reaction product from (c).

* * * * *